(12) United States Patent
Altenschmidt et al.

(10) Patent No.: US 7,506,631 B2
(45) Date of Patent: Mar. 24, 2009

(54) INTERNAL COMBUSTION ENGINE

(75) Inventors: Frank Altenschmidt, Biberach (DE); Dietmer Bertsch, Aspach (DE); Michael Dohn, Vaihingen (DE); Uwe Schaupp, Wernau (DE); Dirk Voigtlaender, Korntal-Münchingen (DE)

(73) Assignee: Daimler AG, Stuttgart (DE)

( * ) Notice: Subject to any disclaimer, the term of this patent is extended or adjusted under 35 U.S.C. 154(b) by 8 days.

(21) Appl. No.: 11/800,005

(22) Filed: May 1, 2007

(65) Prior Publication Data

US 2007/0261665 A1    Nov. 15, 2007

Related U.S. Application Data

(63) Continuation-in-part of application No. PCT/EP2005/011275, filed on Oct. 2, 2005.

(30) Foreign Application Priority Data

Nov. 3, 2004   (DE) .................. 10 2004 053 050

(51) Int. Cl.
  *F02B 3/00*    (2006.01)
(52) U.S. Cl. .................. 123/298; 123/305; 123/309
(58) Field of Classification Search .............. 123/294, 123/295, 298, 299, 301, 305, 309
  See application file for complete search history.

(56) References Cited

U.S. PATENT DOCUMENTS

| | | | |
|---|---|---|---|
| 5,622,150 A | 4/1997 | Fraidl et al. | |
| 5,941,207 A * | 8/1999 | Anderson et al. | 123/295 |
| 6,095,114 A | 8/2000 | Horie et al. | |
| 6,543,408 B1 * | 4/2003 | Ernst et al. | 123/295 |
| 6,575,132 B1 * | 6/2003 | Ernst et al. | 123/295 |
| 6,629,519 B1 * | 10/2003 | Bertsch et al. | 123/305 |
| 6,725,828 B1 | 4/2004 | Han et al. | |
| 6,748,917 B1 * | 6/2004 | Hoffmann et al. | 123/295 |
| 6,971,365 B1 * | 12/2005 | Najt et al. | 123/305 |
| 7,441,536 B2 * | 10/2008 | Bertsch | 123/298 |

FOREIGN PATENT DOCUMENTS

| | | |
|---|---|---|
| DE | 195 10 053 | 10/1995 |
| DE | 197 16 642 | 10/1998 |
| DE | 199 11 023 | 9/2000 |
| DE | 100 12 969 | 11/2001 |
| DE | 100 60 682 | 6/2002 |
| EP | 0 412 008 | 2/1991 |
| WO | WO 99/22125 | 5/1999 |
| WO | WO 2004/007944 | 1/2004 |

* cited by examiner

*Primary Examiner*—Hai H Huynh
(74) *Attorney, Agent, or Firm*—Klaus J. Bach

(57) ABSTRACT

In an internal combustion engine having at least one cylinder with a combustion chamber formed between a piston and a cylinder head, inlet and outlet ducts formed in the cylinder head, a fuel injector arranged in the cylinder head into for forming a hollow fuel cone in the combustion chamber and a spark plug arranged such that, during The injection of fuel, the electrodes of the spark plug are outside the injected hollow fuel cone, the spark plug and the fuel injector are positioned in such a way that a first distance (C) is provided between an injector axis and a free end of the central electrode of the spark plug, and the cylinder bore has a diameter (D), with a ratio (C/D) of the first distance (C) and a bore diameter (D) being in a range of 0.1 to 0.19, in particular 0.13 to 0.17.

8 Claims, 1 Drawing Sheet

INTERNAL COMBUSTION ENGINE

This is a Continuation-in-Part Application of pending International Patent Application PCT/EP2005/011275 filed Oct. 2, 2005 and claiming the priority of German Patent Application 10 2004 053 050.5 filed Nov. 3, 2004.

BACKGROUND OF THE INVENTION

The invention relates to a spark ignition internal combustion engine with direct fuel injection having at least one cylinder including a combustion chamber formed between a cylinder head and a piston with an inlet and an outlet duct formed in the cylinder head and a fuel injector and a spark plug mounted in the cylinder head so as to extend into the combustion chamber.

When operating spark ignition internal combustion engines with direct injection, injection nozzles are used which are intended to ensure improved combustion with low formation of emissions by forming a specific shape of fuel jet. In particular in a jet-controlled combustion method, outwardly opening injection nozzles are used to configure an optimized fuel injection pattern.

DE 199 11 023 C2 discloses an internal combustion engine in which fuel is introduced into the combustion chamber in the form of a hollow cone by means of an outwardly opening injection nozzle. In a stratified charge mode in such a context the fuel meets compressed combustion air in the combustion chamber so that as a result a peripheral eddy flow pattern is formed in the combustion chamber. An ignitable fuel/air mixture thus reaches the vicinity of a spark plug. The spark plug is arranged in such a way that the electrodes of the spark plug project into the peripheral eddy flow pattern but are disposed outside an outer surface of the hollow cone of fuel generated during the fuel injection.

The arrangement of the injection nozzle in the combustion chamber and the positioning of a spark plug which is provided to ignite a fuel/air mixture which is formed are important for the combustion properties of the internal combustion engine and its efficiency. In order to bring about reliable ignition, the configuration of the combustion chamber is designed so as to avoid the occurrence of misfiring during engine operation. The misfiring is frequently due to the fact that tolerances in the fabrication of the injection nozzles cause fuel jets to form slight deviations from an ideal jet structure despite compliance with the approved tolerance values.

It is the object of the present invention to provide a spark ignition internal combustion engine with direct fuel injection in which the formation of the air/fuel mixture and the combustion of the mixture in the combustion chamber are improved.

SUMMARY OF THE INVENTION

In an internal combustion engine having at least one cylinder with a combustion chamber formed between a piston and a cylinder head, at least one inlet duct and at least one outlet duct formed in the cylinder head, a fuel injector arranged in the cylinder head so as to project into the combustion chamber and having an outwardly opening injection nozzle through which fuel in the form of a hollow cone is injected into the combustion chamber and a spark plug arranged in the combustion chamber in such a way that, during the injection of fuel, the electrodes of the spark plug are outside the injected hollow cone of fuel, the spark plug and the fuel injector are positioned in such a way that a first distance (C) is provided between an injector axis and a free end section of the central electrode of the spark plug, and the cylinder bore has a diameter (D), with a ratio (C/D) of the first distance (C) and a bore diameter (D) being in a range of 0.1 to 0.19, in particular 0.13 to 0.17.

As a result, a first distance between the spark plug and a fuel outlet opening in the combustion chamber is provided which is adapted to the cylinder bore so that a favorable distribution of fuel is obtained in the combustion chamber in order to ensure reliable ignition. With the present invention, the formation of ignitable mixture in the vicinity of the electrodes of the spark plug is optimized in particular with respect to a jet-controlled combustion method. The effects which are surprisingly achieved as a result of this are due to the favorable matching of a peripheral eddy formed in the combustion chamber and the cylinder bore diameter.

In a particular embodiment of the invention, the fuel injector is positioned in the cylinder head in such a way that a second distance is established between a fuel nozzle outlet opening and an inlet duct axis, whereby a second ratio of the second distance with respect to the bore diameter is provided in a range from 0.15 to 0.22, in particular from 0.17 to 0.19. As a result, a remarkable and rapid movement of the fuel charge in tune with the cylinder diameter is obtained within the eddy pattern formed in the cylinder. The fuel in the outer regions of the peripheral eddy pattern is thus rapidly mixed with the combustion air.

Preferably, the fuel injector is positioned in such a way that a third distance is established between the fuel outlet opening and an outlet duct axis, wherein a third ratio of the third distance with respect to the bore diameter is provided in a range between 0.16 and 0.24, preferably between 0.18 and 0.22. In the proposed range, flow conditions which are matched to the cylinder bore diameter according to the invention are formed, which further improve the mixing of the droplets of fuel with the combustion air in the peripheral eddy current region.

In another embodiment of the invention, the spark plug is positioned in such a way that a fourth distance is provided between the outlet duct axis and a free end section of the central electrode of the spark plug, whereby a fourth ratio of the fourth distance with respect to the cylinder bore diameter is established in a range from 0.02 to 0.13, in particular from 0.04 to 0.1. As a result, a charge movement provided during a charge cycle is adapted to the quantity of fuel injected into the combustion chamber so that the fuel is distributed more uniformly within the hollow cone area of fuel which is formed. Ignitable mixture components are thus readily available in the region of the electrodes of the spark plug at the ignition time.

The spark plug is preferably positioned in such a way that a fifth distance is established between the inlet axis and the free end section of the central electrode of the spark plug, such that a fifth ratio of the fifth distance with respect to the cylinder bore diameter lies in a range between 0.25 and 0.4, preferably between 0.3 and 0.35. This ensures that the particles of fuel are guided along the hollow cone in the direction of the spark plug in a way which is controlled and matched to the particular configuration of the combustion chamber. Furthermore, a sufficient contact surface for the combustion air for the droplets of fuel which are eddied at the outer region of the hollow cone is made available as a function of the bore diameter.

The invention is described below in a simplified form with reference to the accompanying drawings:

DESCRIPTION OF VARIOUS EMBODIMENTS

Figure 1:
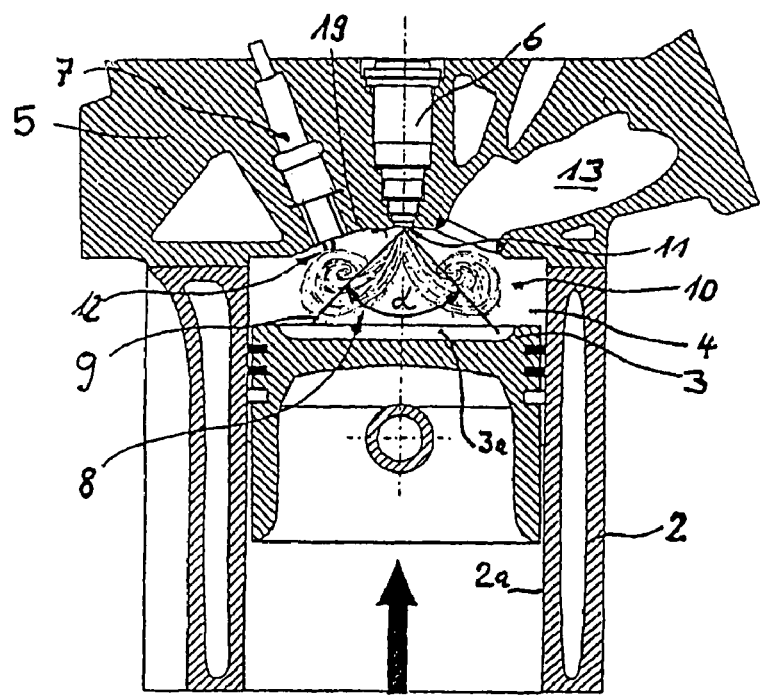
FIG. 1 is a schematic sectional illustration of a cylinder of a spark ignition internal combustion engine with direct fuel injection.

FIG. 1 shows a cylinder 2 of a spark ignition internal combustion engine 1 with direct injection, in which a combustion chamber 4 is bounded between a piston 3 and a cylinder head 5. The internal combustion engine comprises, per combustion chamber 4, at least one inlet 13, at least one outlet 14, a fuel injector 6 and a spark plug 7, wherein the fuel injector 6 and the spark plug 7 are provided adjacent to one another in the central region of a combustion chamber roof 19. The number of inlet valves and outlet valves can be varied. The invention according to the present exemplary embodiment is suitable in particular for internal combustion engines which have two inlet valves and two outlet valves. Inlet 13 and outlet 14 are provided in the cylinder head 5, and preferably a piston recess 3a is provided in the piston 3. Furthermore, the cylinder 2 has a cylinder bore 2a with a bore diameter D.

In order to bring about optimum ignition in the region of the peripheral eddy 10 present at the electrodes 12 of the spark plug 7 at the ignition time, it is necessary to adapt the configuration of the combustion chamber to the jet-controlled combustion method. The aim of the invention is therefore that, by means of a corresponding configuration of the combustion chamber, an ignition spark is formed at the spark plug 7 at a particular ignition time while in contact with ignitable regions of the peripheral eddy current 10 formed in the combustion chamber.

Figure 2:
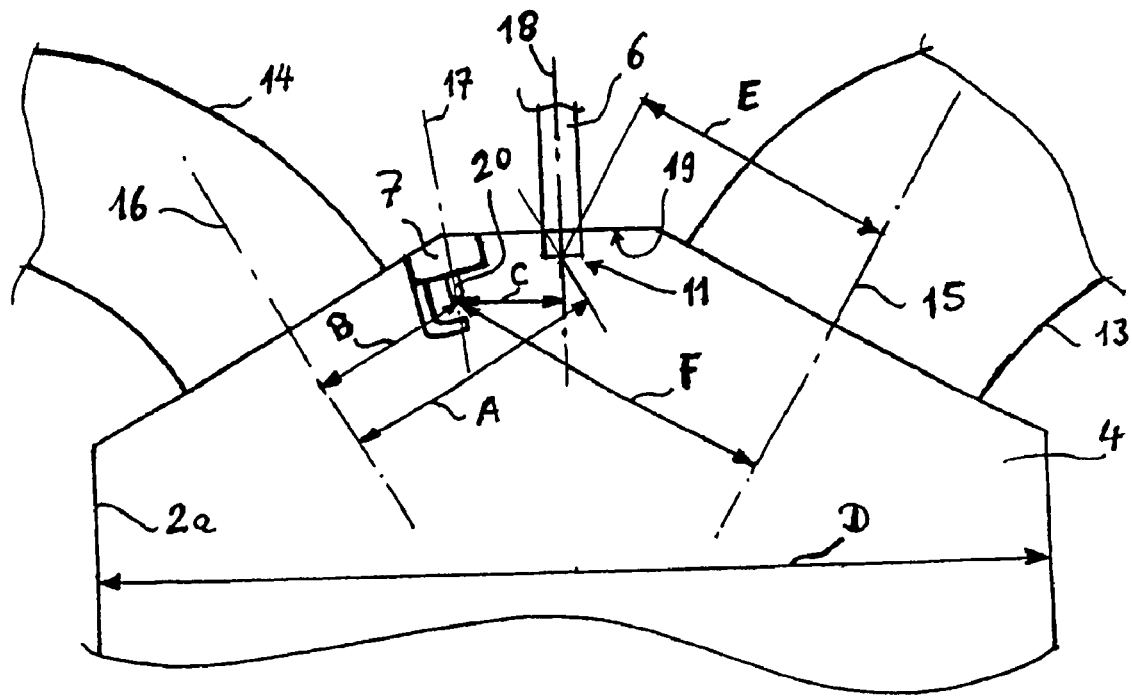
FIG. 2 is a schematic enlarged sectional illustration of a combustion chamber of the internal combustion engine according to FIG. 1.

According to the invention, the spark plug 7 and of the fuel injector 6 are arranged in a certain way with respect to the combustion chamber and in particular with respect to the cylinder bore 2a. According to FIG. 2, the fuel injector 6 is positioned in the central region of the combustion chamber roof 19 and has an outwardly opening injection nozzle, with a fuel outlet opening 11 of the injection nozzle projecting into the combustion chamber 4. The spark plug 7 is also arranged in the combustion chamber roof between the outlet duct. 16 and the fuel injector 6. However, it can also be arranged it at the inlet area within the context of the invention. The fuel injector 6 and the spark plug 7 are arranged in the combustion chamber in such a way that a first ratio C/D of the first distance C to the cylinder bore diameter D is in a range from 0.1 to 0.19, in particular from 0.13 to 0.17. The first distance C corresponds to a shortest distance between a fuel injector axis 18 and a free end section of the central electrode 20 of the spark plug. The spark plug 7 can be arranged between the inlet duct 13 and the fuel injector 6 or between the outlet duct and the fuel injector 6 while complying with the first ratio C/D. The ratios which are provided bring about an arrangement of the spark plug and fuel injector which is adapted to the cylinder bore and with which the formation of ignitable mixture in the vicinity of the electrodes of the spark plug is ensured. As a result, the occurrence of misfiring is avoided. The first ratio C/D brings about favorable matching between the distribution of fuel in the region of the spark plug 7 and the bore diameter D.

The present invention also provides for the arrangement of the fuel injector 6 to be selected in a way which is matched to the positions of the inlet duct 15 and outlet duct 16 relative to the cylinder bore 2a. As a result, with the aid of the proposed configuration of the combustion chamber for minimizing the occurrence of misfiring, the possible occurrence of zones in the region of the electrodes which are low in fuel at an ignition time is avoided. The combustion chamber 4 of the internal combustion engine 1 according to the invention is embodied in such a way that a second ratio E/D of the second distance E with respect to the bore diameter D lies in a range from 0.15 to 0.22, in particular from 0.17 to 0.19. In this context, the second distance E corresponds to a shortest distance between the fuel outlet opening 11 and a central axis 15 of the inlet opening 13. As a result of the proposed second distance E, the quantity of fuel in the outer region of the peripheral eddy 10 is mixed intensively with the compressed combustion air. This promotes the conveyance of ignitable mixture into the vicinity of an ignition spark at the spark plug 7.

In order also to ensure the formation of an ignitable fuel/air mixture in the region of the electrodes 12, the invention provides a configuration of the combustion chamber in which a third ratio A/D of the third distance A with respect to the cylinder bore diameter D lies in a range from 0.16 to 0.24, in particular from 0.18 to 0.22. In this context, the third distance A corresponds to a shortest distance between the fuel outlet opening 11 and a central axis 16 of the outlet opening 14.

The present invention also provides for the arrangement of the spark plug 7 to be selected in a way which is matched to the positions of the inlet duct and outlet duct relative to the cylinder bore 2a. According to a further embodiment of the invention, a fourth ratio B/D of the fourth distance B with respect to the bore diameter D lies in a range from 0.02 to 0.13, in particular from 0.04 to 0.1. In this context, the fourth distance B corresponds to a shortest distance between a free end section of the central electrode of the spark plug 7 and a central axis 16 of the outlet opening 14.

Furthermore, the invention provides for a fifth ratio F/D of the fifth distance F with respect to the bore diameter D to lie in a range from 0.25 to 0.4, in particular from 0.3 to 0.35. In this context, the fifth distance F corresponds to a shortest distance between a free end section of the central electrode of the spark plug 7 and a central axis 15 of the inlet opening 13. As a result of the ratio which is provided the conveyance of the ignitable mixture components in the outer region of the peripheral eddy 10 in the direction of the spark plug 7 is promoted in a way which is matched to a charge movement formed in the combustion chamber 4.

The internal combustion engine 1 illustrated in FIG. 1 operates according to the fourth stroke principle, in which case according to the invention the internal combustion engine can likewise be embodied as a spark ignition two-stroke internal combustion engine with direct fuel injection. In the first stroke, combustion air is fed to the combustion chamber 4 through the inlet duct 13, while the piston 3 moves downwardly to a bottom dead center. In the following compression stroke, the piston 3 moves upwardly from the bottom dead center to a top dead center, in which case the fuel is injected in a stratified charge mode of the internal combustion engine 1 during the compression stroke. In the region of the top dead center, a fuel/air mixture which is formed is ignited by means of the spark plug 7, and the piston 3 moves downwardly to the bottom dead center. In the last stroke, the piston 3 moves again upwardly to the top dead center and expels the exhaust gases from the combustion chamber 4.

The internal combustion engine 1 according to the present exemplary embodiment is operated in such a way that operation occurs in the lower and central rotational and load ranges in the stratified charge mode and in the upper load range in the homogeneous mode. The invention is suitable in particular for internal combustion engines having an engine displacement volume of between 2 and 7 liters, preferably between 3 and 6 liters. Furthermore, bore diameters between 85 mm and 100 mm are preferred. In particular, in the stratified charge mode a jet-controlled combustion method occurs. The fuel is injected at a fuel injection pressure of approximately 60 to 500 bar. In particular in the stratified charge mode the fuel injection occurs at a fuel injection pressure from approximately 180 to 220 bar, preferably 195 to 205 bar at a time at which a counter-pressure in the combustion chamber during fuel injection is between eight and twenty bar, preferably between ten and sixteen bar. This corresponds in the present exemplary embodiment to a crank angle range between 50° and 10° before an ignition top dead center. The crank shaft range which is specified here serves only as an example because, depending on the design and method of operation of the internal combustion engine and, depending on the load point, the counterpressure range or cylinder pressure range which is proposed according to the invention may be in a different crank angle range. For example, the proposed counterpressure in the combustion chamber can easily be in an earlier crank angle range in supercharged internal combustion engines than in non-supercharged internal combustion engines.

In the jet-controlled combustion method according to the invention, an outwardly opening injection nozzle 11 is preferably used which provides for a hollow cone 8 of fuel with an angle α between 75° and 100°, preferably between 85° and 95° or between 80° and 90°. Since the hollow cone 8 of fuel meets combustion air which is compressed in the combustion chamber 4, a toroidal peripheral eddy current 10 is formed in the combustion chamber 4 in such a way that an ignitable fuel/air mixture is formed in the region of the electrodes 12 of the spark plug 7. The arrangement of the spark plug 7 is selected such that the electrodes 12 of the spark plug 7 project into the peripheral eddy current 10, in which case the electrodes are disposed outside an outer surface area 9 of the fuel cone 8 formed during the injection of fuel. As a result, the electrodes 12 of the spark plug 7 are hardly wetted with fuel. As a result of the ratios which are implemented, optimum combustion is made possible, in particular in the stratified charge mode of engine operation, and reliable ignition is achieved at all load points of the internal combustion engine 1.

What is claimed is:

1. An internal combustion engine (1) having
   at least one cylinder (2) with a cylinder bore (2a) in which a combustion chamber (4) is bounded between a piston (3) and a cylinder head (5),
   at least one inlet duct (13) and at least one outlet duct (14) formed in the cylinder head (5),
   a fuel injector (6) arranged in the cylinder head (5) and having an outwardly opening injection nozzle for the injection of fuel in the form of a hollow cone (8) into the combustion chamber (4), and
   a spark plug (7) arranged in the cylinder head (5) so as to extend into the combustion chamber (4) in such a way that, during the injection of fuel, the electrodes (12) of the spark plug (7) lie outside the hollow fuel injection cone, and
   the spark plug (7) and the fuel injector (6) are positioned in such a way that a first distance (C) is established between an axis (18) of the fuel injector (6) and a free end section of a central electrode (20) of the spark plug, and
   the cylinder bore (2a) having a diameter (D) providing for
   a first ratio (C/D) of the first distance (C) with respect to the cylinder bore diameter (D) in a range of from 0.1 to 0.19
   the fuel injector (6) being positioned in the cylinder head (5) such that there is a second distance (E) between a fuel outlet opening (11) and an inlet duct axis (15), providing for
   a second ratio (E/D) of the second distance (E) with respect to the bore diameter (D) in a range of from 0.15 to 0.22, and
   the spark plug (7) being positioned in such a way that a third distance (B) is formed between an outlet duct axis (16) and the free end of the central electrode of the spark plug (7), whereby
   a fourth ratio (B/D) of the fourth distance (B) with respect to the bore diameter (D) is provided in a range of from 0.02 to 0.13.

2. The internal combustion engine according to claim 1, wherein the ratio C/D is from 0.13 to 0.17.

3. The internal combustion engine as claimed in claim 1, wherein the second ratio E/D is from 0.17 to 0.19.

4. The internal combustion engine as claimed in claim 1, wherein
   the fuel injector (6) is positioned in such a way that a fourth distance (A) is provided between the fuel outlet opening (11) and an outlet duct axis (16), whereby
   a third ratio (A/D) of the third distance (A) with respect to the bore diameter (D) is provided in a range between 0.16 and 0.24.

5. The internal combustion engine according to claim 4, wherein the third ratio (A/D) is between 0.13 and 0.22.

6. The internal combustion engine as claimed in claim 1, wherein the fourth ratio (BID) is from 0.04 to 0.1.

7. The internal combustion engine as claimed in claim 1, wherein
   the spark plug (7) is positioned in such a way that a fifth distance (F) is provided between the inlet duct axis (15) and the free end section of the central electrode of the spark plug, such that
   a fifth ratio (F/D) of the fifth distance (F) with respect to the bore diameter (D) lies in a range between 0.25 and 0.4.

8. The internal combustion engine as claimed in claim 7, wherein the fifth ratio F/D is between 0.3 and 0.35.

* * * * *